Aug. 24, 1937. S. H. COWIN Re. 20,477

REFRIGERATING APPARATUS

Original Filed April 18, 1934 2 Sheets-Sheet 1

INVENTOR.
Stuart H. Cowin,
BY
Spencer Hardman & Fehr
ATTORNEYS

Aug. 24, 1937. S. H. COWIN Re. 20,477

REFRIGERATING APPARATUS

Original Filed April 18, 1934 2 Sheets-Sheet 2

Stuart H. Cowin Inventor

Spencer Hardman & Fehr Attorneys

Reissued Aug. 24, 1937 Re. 20,477

UNITED STATES PATENT OFFICE 20,477

REFRIGERATING APPARATUS

Stuart H. Cowin, Dayton, Ohio, assignor to General Motors Corporation, Dayton, Ohio, a corporation of Delaware Original No. 2,053,945, dated September 8, 1936, Serial No. 721,183, April 18, 1934. Application for reissue January 7, 1937, Serial No. 119,470

8 Claims. (Cl. 62—3)

Figure 1:
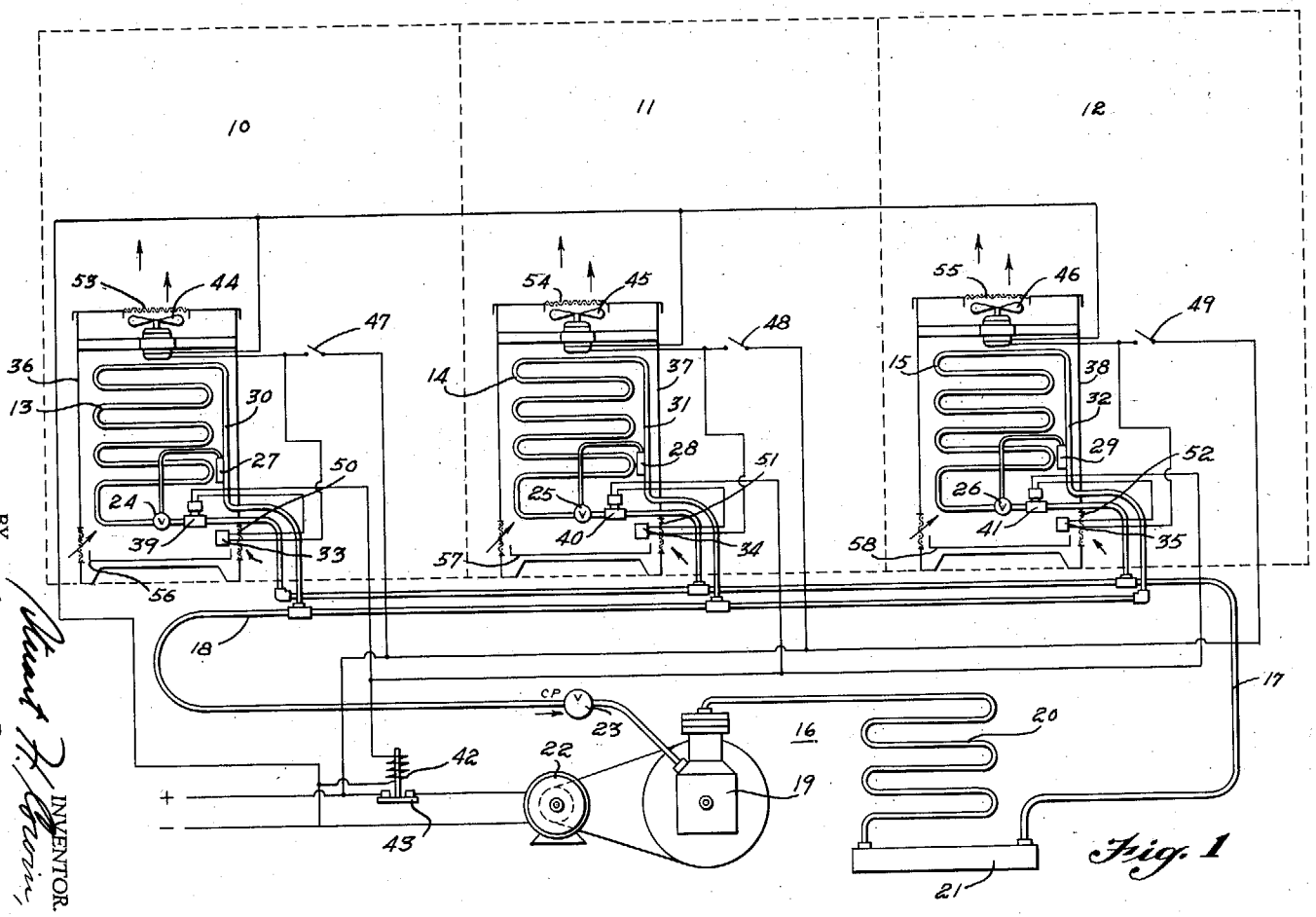

This invention relates to refrigeration and more particularly to the conditioning of air.

An object of this invention is to provide a method and apparatus for conditioning air in a manner to balance the varying heat absorption from the air with the heat dissipation, from the system, and to overcome the tendency to produce detrimentally low temperatures in the air cooling devices or zones when the total refrigeration load is relatively small, or where one or more of a plurality of air conditioning zones are inactive.

Further objects and advantages of the present invention will be apparent from the following description, reference being had to the accompanying drawings, wherein a preferred form of the present invention is clearly shown.

Figure 2:
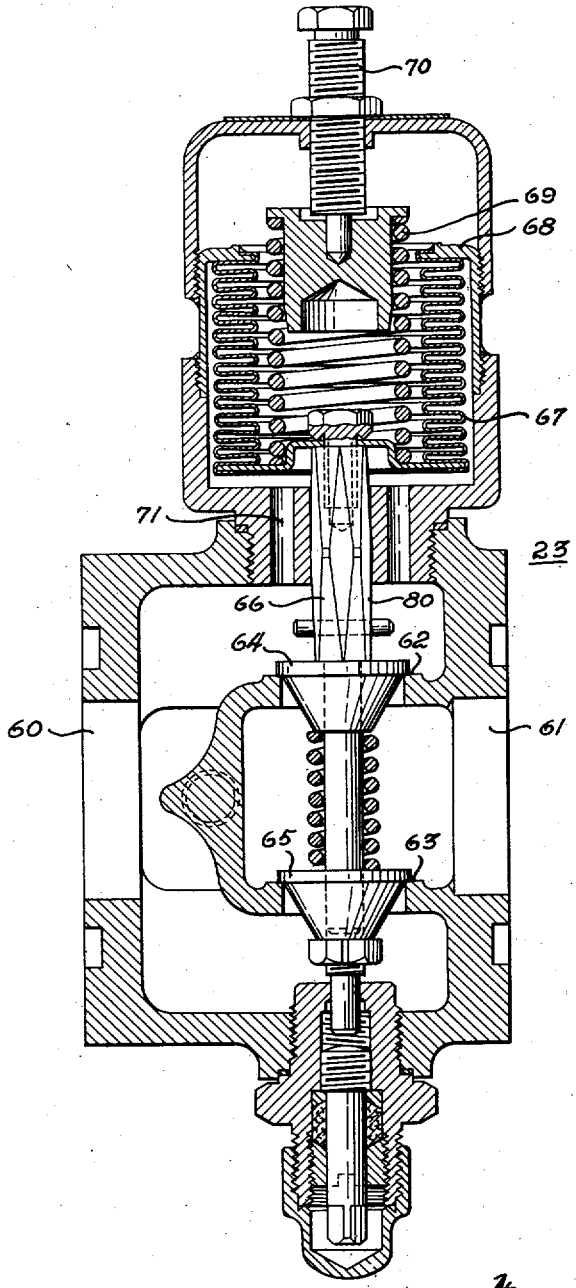

In the drawings:

Fig. 1 is a diagrammatic representation of an apparatus embodying features of my invention; and Fig. 2 is a cross-sectional view of a type of pressure regulating valve which may be used in the suction line.

In practicing my invention, the air in one or more compartments or spaces 10, 11 and 12 is conditioned by the cooling action of one or more evaporators or evaporating zones 13, 14 and 15 where heat absorption from the air, or refrigeration load, varies from time to time. The refrigerant evaporated in these evaporators is conveyed to refrigerant liquefying unit 16 where the heat dissipation from the system tends normally to be constant. Here the refrigerant is liquefied and is returned through the liquid refrigerant line 17 to the evaporators. The evaporated refrigerant is conveyed from the evaporators to the unit 16 through the suction line or connection 18. The refrigerant liquefying or compressor unit 16 may include a compressor 19, a condenser 20, liquid refrigerant receiver 21, and a motor 22 which drives the compressor 19.

In an air conditioning method or apparatus of this kind, not only the total refrigeration load from all of the evaporating zones is likely to vary widely from time to time, but the individual load on any one evaporating zone is also quite likely to vary widely. The volumetric capacity, and hence heat dissipating power, of compressor 19, on the other hand tends to be constant because of the constant speed characteristics of the more desirable modern motors. Thus complications result unless means are provided to balance the constant volumetric capacity or heat dissipating power of the compressor unit with the varying refrigeration demands upon the system. When the refrigeration demands are relatively small, the compressor unit tends to reduce the refrigerant temperatures in the evaporators to the point where moisture from the air freezes on the evaporators and eventually clogs them. Also there is a tendency for the suction lines to become frosted because of unavoidable suction of liquid refrigerant from the evaporators. It is to the avoidance of these and other undesirable results that this invention is directed.

Means are provided for compensating or balancing the constant volumetric or heat dissipating capacity of the unit 16 while it is operating with the varying heat absorption or evaporation in the evaporators 13, 14 and 15. To this end, heat absorption or automatic pressure limiting means in the form of valve 23 is placed in the suction passage 18 which automatically limits the fall in pressure in the suction connection 18 adjacent the evaporators and prevents the refrigerant vapor pressure or temperature in the evaporators from falling sufficiently low to cause freezing of moisture from the air on the evaporators. Also means are provided for controlling the flow of refrigerant to the various evaporators in accordance with the refrigeration demands of the air in the various spaces. Thus the flow of liquid refrigerant from the line 17 to the evaporators 13, 14 and 15 is controlled by means of automatic expansion valves 24, 25 and 26 each of which tends to feed liquid refrigerant into the evaporators when the pressure therein falls below a predetermined limit. The thermostatic bulbs 27, 28, and 29 are placed in the connections 30, 31 and 32 from the outlets of the evaporators to the suction line 18. These thermostatic bulbs throttle the valves 24, 25 and 26 whenever the liquid refrigerant in the evaporators tends to "spill over" into the suction line. In addition, thermostatic controls in the form of thermostatic switches 33, 34 and 35 are placed near the air inlets to the air conditioners 36, 37 and 38 where the air is representative of the air in the compartments 10, 11 and 12 respectively. These thermostatic switches control the flow of refrigerant in the respective evaporators and control the operation of the compressor through the motor 22, causing it to stop when all of said switches are open and to start when one or more of the switches are closed. This is accomplished by placing solenoid valves 39, 40 and 41 adjacent valves 24, 25 and 26. These solenoid valves prevent flow of liquid refrigerant into the respective evaporators when the temperature in the respective spaces 10, 11 and 12 falls below a predetermined limit, and permit the flow of liquid refrigerant into the evaporators when that temperature rises above a predetermined limit. In addition, the switches 33, 34 and 35 control the operation of the compressor 19 and are therefore connected to the relay 42 so that the contact 43 is opened when all of the thermostatic switches are open and is closed when any one of the switches is closed. The relay 42 controls the starting and stopping or motor 22 and compressor 19.

In addition, motor driven blowers 44, 45 and 46, which cause the circulation of air over the evaporators are controlled by means of manual switches 47, 48 and 49, which switches are in series with the thermostatic switches 33, 34 and 35 so that any one air conditioner, and all its functions, may be cut in or out by closing or opening its respective manual switch.

The air conditioners 36, 37 and 38 may be of any type desired. In this particular embodiment, they may take the form of vertical casings having air inlets 50, 51 and 52 at the bottom, where the air flow is indicated by arrows, and having air outlets 53, 54 and 55 at the top above blowers 44, 45 and 46. The evaporators 13, 14 and 15 are placed within the casings as will be readily apparent from the drawings. Drain pans 56, 57, 58 are placed at the bottom of casing to catch any moisture condensed on the evaporator.

Fig. 2 shows a type of valve which may be used in the suction line 18 and which is diagrammatically represented at 23 in Fig. 1. Refrigerant from the evaporators enter the check valve 23 at the inlet 60 and leave through the outlet 61 from whence they continue to the compressor. The valve structure 23 includes valve seats 62 and 63 upon which the balanced valves 64 and 65 seat. These valves are mounted on a stem 66 upon which a bellows 67 is secured. The bellows 67 is also secured to the casting 68 so that the interior of the bellows is subjected to any constant pressure such as atmospheric pressure. The bellows is also provided with an adjustable spring 69 which may be adjusted by means of the screw 70 to calibrate the valve. Passages 71 are provided so that the outside of the bellows is subjected to the evaporator pressure. As the pressure is decreased the bellows is expanded and thus tends to throttle or close the valves.

The stem 66 may be octagonal in cross-section with the sides 80 of the octagon tapering toward each end of the stem. This provides a relatively small bearing surface at the center of the stem to permit free play at both ends of the stem.

In operation, the refrigerant liquefying unit 16 is started whenever any one or more of the switches 33, 34 or 35 are closed by rise in temperature in that environment. If the refrigerating load imposed on the one or more evaporators happens to be the same as the heat dissipating capacity of the unit 16, the valve 23 opens fully and permits the compressor 19 to withdraw refrigerant from the active evaporator or evaporators to its full capacity. However, if the refrigerating load imposed on the active evaporators diminishes, due to low outside atmospheric temperatures, or because one or more of the evaporators are rendered automatically or manually inactive, the load is quite likely not to balance with the normal heat dissipating capacity of the unit 16. Under these conditions, if it were not for action of valve 23, the unit 16 would reduce the vapor-pressure, and hence the temperature, of the liquid refrigerant in the active evaporators to the point where moisture from the air would be frozen on the surfaces of the evaporators. If this would occur, the refrigeration load would be further decreased by the reduced flow of air through the ice clogged passages and thus the undesirable condition would be aggravated. With the valve 23, on the other hand, the flow of refrigerant to the compressor, and hence the heat dissipating capacity of the compressing unit 16, is throttled or limited to the extent that it cannot reduce the vapor-pressure and temperature of the refrigerant in the evaporators to a point where moisture from the air would be frozen on them. Thus proper temperatures are maintained on the air cooling surfaces of the apparatus so that air may be properly cooled and moisture may even be condensed, but not frozen, on them regardless of the variance between the heat absorption by the evaporators and the normal heat dissipating capacity of the compressor unit. An efficient and satisfactory mode of conditioning air is thus provided.

While the form of embodiment of the invention as herein disclosed, constitutes a preferred form, it is to be understood that other forms might be adopted, all coming within the scope of the claims which follow.

What is claimed is as follows:

1. An air conditioning apparatus comprising a compressor, a motor driving said compressor, a condenser connected to said compressor, a plurality of air conditioning evaporators connected to said condenser, a suction connection between said evaporators and said compressor, a device responsive to a psychrometric function of air controlling the evaporation of refrigerant in one of said evaporators, and means automatically limiting the quantity of refrigerant compressed by said compressor while operating to prevent said compressor from producing a vapor pressure in said evaporators sufficiently low to cause freezing of moisture on said evaporators.

2. An air conditioning apparatus comprising a compressor, a motor driving said compressor, a condenser connected to said compressor, a blower for each evaporator, a plurality of air conditioning evaporators connected to said condenser, a suction connection between said evaporators and said compressor, a device responsive to a psychrometric function of air controlling the evaporation of refrigerant in one of said evaporators, and means automatically limiting the quantity of refrigerant compressed by said compressor while operating to prevent said compressor from producing a vapor pressure in said evaporators sufficiently low to cause freezing of moisture on said evaporators.

3. An air conditioning apparatus comprising a compressor, a motor driving said compressor, a condenser connected to said compressor, a plurality of air conditioning evaporators connected to said condenser, a suction connection between said evaporators and said compressor, a switch responsive to a psychrometric function of air for each evaporator, each switch controlling the evaporation of refrigerant in the respective evaporator and said switches controlling said motor to cause said motor to stop when all of said switches are open and to start when one or more of said switches are closed, the means automatically limiting the quantity of refrigerant compressed by said compressor while operating to prevent said compressor from producing a vapor pressure in said evaporators sufficiently low to cause freezing of moisture on said evaporators.

4. An air conditioning apparatus comprising a compressor, a motor driving said compressor, a condenser connected to said compressor, a plurality of air conditioning evaporators connected to said condenser, a suction connection between said evaporators and said compressor, a switch responsive to a psychrometric function of air for each evaporator, each switch controlling the evaporation of refrigerant in the respective evaporator and said switches controlling said motor to cause said motor to stop when all of said switches are open and to start when one or more of said switches are closed and an automatic pressure limiting valve in said suction connection limiting the fall in pressure in said suction connection adjacent said evaporators below a refrigerant vapor pressure sufficiently low to cause freezing of moisture on said evaporators.

5. An air conditioning apparatus comprising a compressor, a motor driving said compressor, a condenser connected to said compressor, a plurality of air conditioning evaporators connected to said condenser, a suction connection between said evaporators and said compressor, a device responsive to a psychrometric function of air controlling the evaporation of refrigerant in one of said evaporators, and an automatic pressure limiting valve in said suction connection limiting the fall in pressure in said suction connection adjacent said evaporators below a refrigerant vapor pressure sufficiently low to cause freezing of moisture on said evaporators.

6. The method of conditioning air in a plurality of air spaces which comprises compressing a refrigerant in a compressing zone as long as a psychrometric function of air in any one of said spaces is above a predetermined limit, condensing said refrigerant and conveying portions to evaporating zones into thermal exchange with the air in said spaces and thereby causing evaporation, withdrawing evaporated refrigerant from said evaporating zones and returning it to said compressing zone, controlling the flow of refrigerant in said evaporating zones in accordance with a psychrometric function of the air in said air spaces, and limiting the return of refrigerant to said compressing zone while compressing refrigerant to maintain the refrigerant temperature in said evaporating zones sufficiently high to prevent freezing of moisture from said air.

7. The method of conditioning air in a plurality of air spaces which comprises compressing a refrigerant in a compressing zone as long as a psychrometric function of the air in any one of said spaces is above a predetermined limit, condensing said refrigerant, conveying portions of said condensed refrigerant for evaporation in evaporating zones in thermal exchange with continuously circulated air in said spaces, controlling the conveyance of said portions in accordance with a psychrometric function of the air in said spaces, withdrawing evaporated refrigerant from said evaporating zones and returning it to said compressing zone, maintaining normal compressing capacity in said compressing zone such that said evaporating zones do not freeze moisture from the air, and throttling the return of evaporated refrigerant to said compressing zone while compressing refrigerant when said evaporating zones evaporate an amount of refrigerant below the normal compressing capacity in said compressing zone to maintain the evaporating pressure in said evaporating zones sufficiently high to prevent freezing of moisture from the air.

8. The method of conditioning air in a plurality of air spaces which comprises compressing a refrigerant in a compressing zone as long as a psychrometric function of the air in any one of said spaces is above a predetermined limit, condensing said refrigerant, conveying portions of said condensed refrigerant for evaporation in evaporating zones in thermal exchange with continuously circulated air in said spaces, controlling the conveyance of said portions in accordance with a psychrometric function of the air in said spaces, withdrawing evaporated refrigerant from said evaporating zones and returning it to said compressing zone, maintaining normal compressing capacity in said compressing zone such that said evaporating zones do not freeze moisture from the air, throttling the return of evaporated refrigerant to said compressing zone while compressing refrigerant when said evaporating zones evaporate an amount of refrigerant below the normal compressing capacity in said compressing zone to maintain the evaporating pressure in said evaporating zones sufficiently high to prevent freezing of moisture from the air, and rendering said compressing zone inactive when the temperatures of the air of said evaporating zones are below their predetermined limits.

STUART H. COWIN.